(12) United States Patent
Choi

(10) Patent No.: US 9,476,751 B2
(45) Date of Patent: Oct. 25, 2016

(54) WATER LEVEL SENSOR AND HEAT EXCHANGER STERILIZING AND HUMIDIFYING APPARATUS HAVING THE SAME

(71) Applicant: SAMSUNG ELECTRONICS CO., LTD., Suwon-si, Gyeonggi-do (KR)

(72) Inventor: Young Kwang Choi, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 177 days.

(21) Appl. No.: 14/526,915

(22) Filed: Oct. 29, 2014

(65) Prior Publication Data

US 2015/0052995 A1   Feb. 26, 2015

Related U.S. Application Data

(62) Division of application No. 13/339,498, filed on Dec. 29, 2011, now Pat. No. 8,899,558.

(30) Foreign Application Priority Data

Jan. 4, 2011 (KR) .................. 10-2011-0000620

(51) Int. Cl.
*G01F 23/00* (2006.01)
*G01F 23/26* (2006.01)
*F24F 11/00* (2006.01)
*F24F 6/00* (2006.01)

(52) U.S. Cl.
CPC ............. *G01F 23/26* (2013.01); *F24F 11/001* (2013.01); *G01F 23/00* (2013.01); *F24F 2006/008* (2013.01); *F24F 2221/225* (2013.01)

(58) Field of Classification Search
CPC ................. G01F 23/00; G01F 23/26

USPC ................. 116/200, 227; 73/290 R
See application file for complete search history.

(56) References Cited

U.S. PATENT DOCUMENTS 6,412,344 B1 * 7/2002 Danicich ............. G01F 23/2968
73/290 V
8,152,973 B2   4/2012 Yamamoto et al.

FOREIGN PATENT DOCUMENTS

| JP | 05039932 | 2/1993 |
| JP | 07260206 | 10/1995 |
| JP | 11182892 | 7/1999 |

OTHER PUBLICATIONS

U.S. Office Action issued Apr. 18, 2014 in copending U.S. Appl. No. 13/339,498.
U.S. Notice of Allowance issued Jul. 30, 2014 in copending U.S. Appl. No. 13/339,498.
U.S. Appl. No. 13/339,498, filed Dec. 29, 2011, Young Kwang Choi, Samsung Electronics Co., Ltd.

* cited by examiner

*Primary Examiner* — Robert A Hopkins
(74) *Attorney, Agent, or Firm* — Staas & Halsey LLP

(57) ABSTRACT

A water level sensor is closely adhered to a storage tank, and a heat exchanger sterilizing and humidifying apparatus allows the water level sensor to be mounted at the outside of the storage tank, thus having a simple configuration. The water level sensor may include a holder, a cap connected to the holder so as to reciprocate within the holder, a case connected to the cap so as to reciprocate within the holder, a sensor part attached to the case to sense the water level in the storage tank, and a spring located between the holder and the cap, wherein the sensor part mounted at the outside of the storage tank and attached to the case by restoring force of the spring when the storage tank contacts the case may be closely adhered to the storage tank and thus may sense a level of water stored in the storage tank.

5 Claims, 7 Drawing Sheets

WATER LEVEL SENSOR AND HEAT EXCHANGER STERILIZING AND HUMIDIFYING APPARATUS HAVING THE SAME

CROSS-REFERENCE TO RELATED APPLICATIONS

This application is a division of U.S. patent application Ser. No. 13/339,498 filed Dec. 29, 2011 which claims the benefit of Korean Patent Application No. 10-2011-0000620, filed on Jan. 4, 2011 in the Korean Intellectual Property Office, the disclosures of each of which are incorporated herein by reference.

BACKGROUND

1. Field

Embodiments relate to a water level sensor which is mounted at the outside of a storage tank to sense a water level in the storage tank and a heat exchanger sterilizing and humidifying apparatus having the same.

2. Description of the Related Art

In general, an air conditioner is an apparatus which cools and heats an indoor space using a refrigerating cycle of a refrigerant including a compressor, a condenser, an expander and a heat exchanger so as to provide a more pleasant indoor environment to a user.

Recently, there has been an increasing preference among consumers for air conditioners having an air purification function to remove dust or bacteria contained in air as well as a function to cool and heat an indoor space.

In the refrigerating cycle of the air conditioner, the heat exchanger greatly influences the temperature and humidity of an indoor space.

For example, the temperature of air introduced into the indoor space is varied according to heat exchanging performance of the heat exchanger, and the humidity of air introduced into the indoor space is varied according to dehumidifying performance of the heat exchanger.

Further, if the air conditioner has not been used for a long time, dust may be accumulated or bacteria may be grown in the air conditioner. If the air conditioner is operated under the condition that the accumulated dust is not washed out or the air conditioner is not sterilized, air discharged from the air conditioner is harmful to humans.

SUMMARY

Therefore, it is an aspect to provide a water level sensor which is closely adhered to a storage tank to sense a water level in the storage tank.

It is another aspect to provide a heat exchanger sterilizing and humidifying apparatus which allows a water level sensor to be mounted at the outside of a storage tank and thus has a simple configuration.

Additional aspects will be set forth in part in the description which follows and, in part, will be obvious from the description, or may be learned by practice of the invention.

In accordance with one aspect, a water level sensor to sense a water level in a storage tank in which water is stored may include a holder, a cap connected to the holder such that the cap reciprocate within the holder, a case connected to the cap such that the case together with the cap reciprocate within the holder, a sensor part attached to the case to sense the water level in the storage tank, and a spring located between the holder and the cap to allow the cap and the case to reciprocate within the holder, wherein the sensor part mounted at the outside of the storage tank and attached to the case by restoring force of the spring when the storage tank contacts the case is closely adhered to the storage tank and thus senses a level of water stored in the storage tank.

Hooks may be provided on the holder so as to mount the holder on another structure.

A fixing part inserted into the spring to fix the spring may be formed on the holder.

Protrusions may be formed on the cap, and guide grooves may be formed on the holder, into which the protrusions formed on the cap may be inserted to guide the cap such that the cap reciprocates within the holder.

A fixing recess into which the spring may be inserted so as to be fixed may be formed on the cap.

Hooks may be formed on the cap so as to connect the cap to the case, and connection holes may be formed on the case such that the hooks formed on the cap are inserted into the connection holes.

In accordance with another aspect, a heat exchanger sterilizing and humidifying apparatus may include a kit on which parts to sterilize a heat exchanger are mounted, a storage tank detachably mounted on the kit to receive and store water and then to convert the stored water into sterilizing water, a spraying device to receive the sterilizing water generated by the storage tank and to spray the sterilizing water to the heat exchanger to sterilize the heat exchanger, and a water level sensor detachably mounted on the kit and closely adhered to the outer surface of the storage tank, when the storage tank is mounted on the kit, to sense a water level in the storage tank.

The storage tank may include a sterilizing water generation device to convert water, supplied thereto and stored therein, into sterilizing water.

The sterilizing water generation device may be an OH-radical electrode.

The kit may include a pump device to supply the sterilizing water, generated by the sterilizing water generation device of the storage tank, to the spraying device, and a sterilizing water supply hose allowing the sterilizing water to be transferred to the spraying device by the pump device.

The kit may further include a power supply device to supply power to the sterilizing water generation device of the storage tank.

The kit may further include an upper cover to cover the upper portion of the kit, and a cover to prevent the power supply device from being exposed to the outside.

A water level sensor mounting hole in which the water level sensor may be mounted may be formed on the kit.

The heat exchanger sterilizing and humidifying apparatus may further include a support mounted on the lower portion of the heat exchanger so as to store the sterilizing water after the sterilizing water supplied to the spraying device has been sprayed onto the heat exchanger to sterilize the heat exchanger.

A discharge hose to discharge the sterilizing water stored in the support to the outside may be connected to the support.

The discharge hose connected to the support may be connected to the kit so as to discharge the sterilizing water leaked from the storage tank mounted on the kit to the outside.

The spraying device may include a nozzle case including a nozzle, and a nozzle cover to cover the upper portion of the nozzle case.

The nozzle case may further include a sealing member to maintain an interval between the nozzle and the heat exchanger.

The water level sensor may include a sensor part to sense the water level in the storage tank and a spring causing the senor part to be closely adhered to the storage tank by the restoring force of the spring when the storage tank is mounted on the kit.

The water level sensor may sense the water level in the storage tank through an electrostatic capacitive method.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
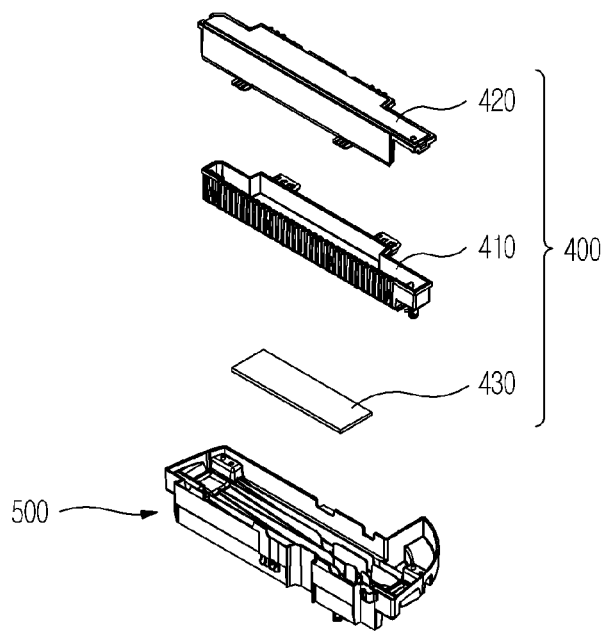
FIG. 1 is an exploded perspective view of a heat exchanger sterilizing and humidifying apparatus in accordance with one embodiment.
Figure 1:
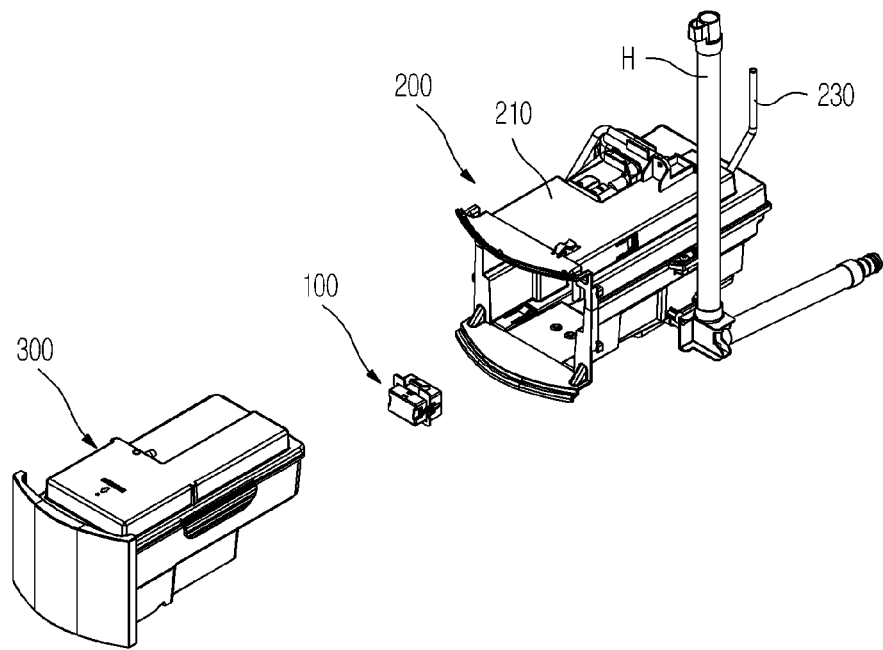

Reference will now be made in detail to the embodiments of the present invention, examples of which are illustrated in the accompanying drawings, wherein like reference numerals refer to like elements throughout.

Figure 2:
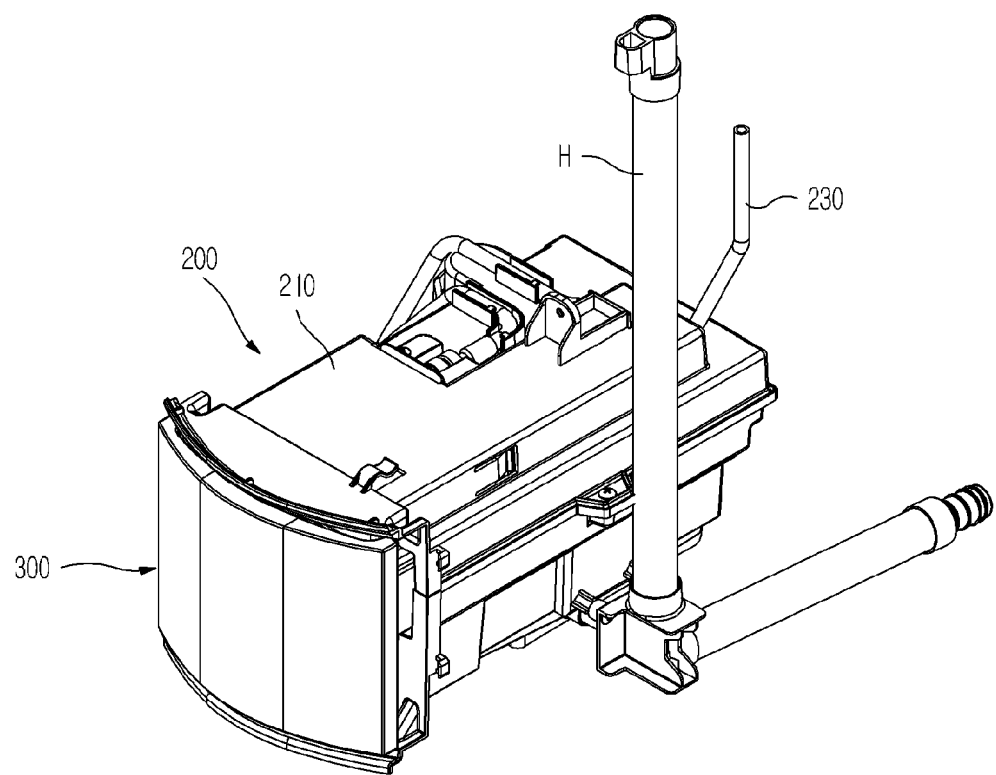
FIG. 2 is a perspective view of the heat exchanger sterilizing and humidifying apparatus in accordance with one embodiment.
Figure 3:
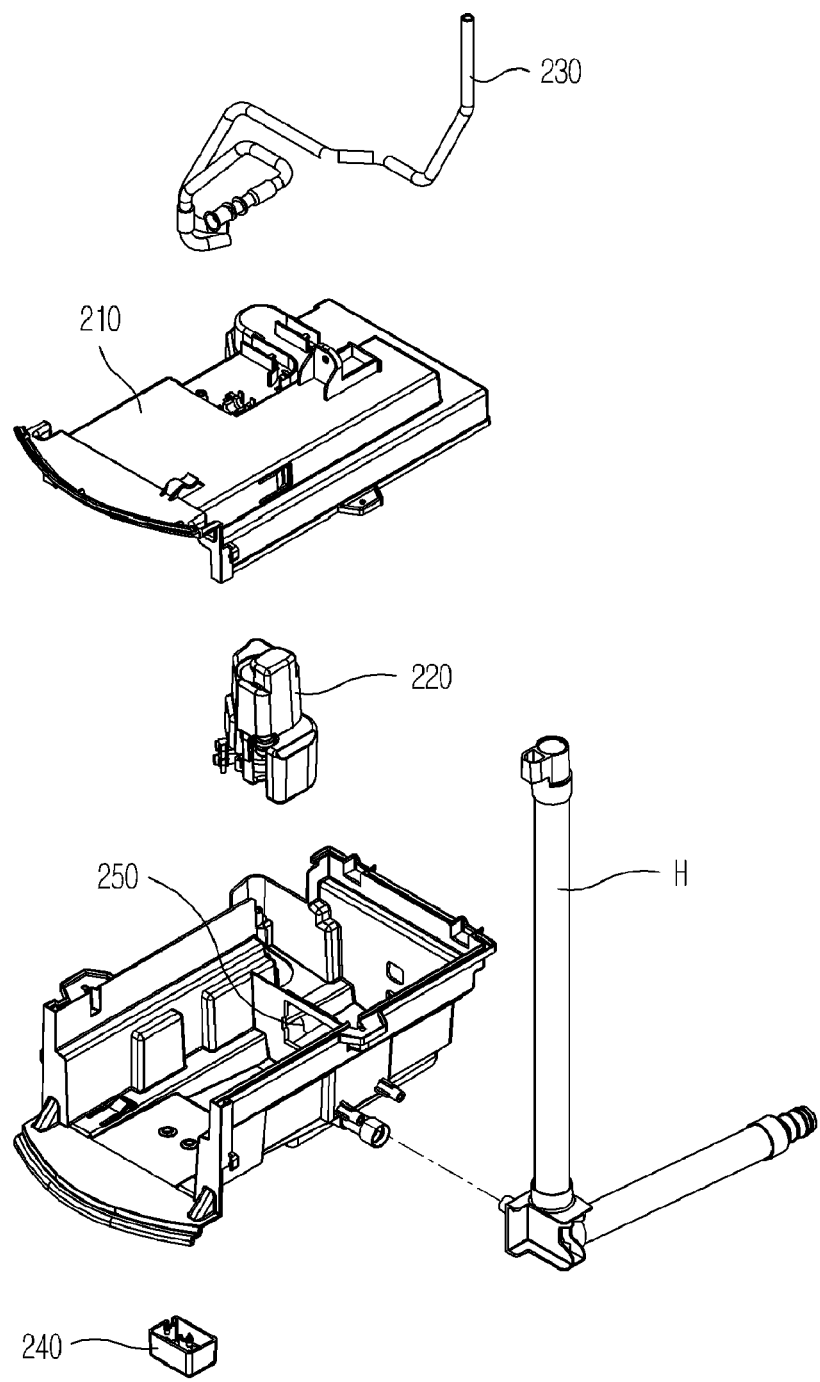
FIG. 3 is an exploded perspective view of a kit in accordance with one embodiment.

FIG. 1 is an exploded perspective view of a heat exchanger sterilizing and humidifying apparatus in accordance with one embodiment, FIG. 2 is a perspective view of the heat exchanger sterilizing and humidifying apparatus in accordance with one embodiment, and FIG. 3 is an exploded perspective view of a kit in accordance with one embodiment.

As shown in FIGS. 1 and 2, a heat exchanger sterilizing and humidifying apparatus 1 may include a kit 200 on which parts to sterilize a heat exchanger are mounted, a storage tank 300 to receive and store water and then to convert the stored water into sterilizing water, a spraying device 400 to receive the sterilizing water generated by the storage tank 300 and to spray the sterilizing water to the heat exchanger to sterilize the heat exchanger, and a water level sensor 100 mounted at the outside of the storage tank 300 to sense a water level in the storage tank 300.

The heat exchanger sterilizing and humidifying apparatus 1 is an apparatus to sterilize and humidify the heat exchanger used in an air conditioner.

If the air conditioner is not used for a long time, bacteria may grow in the heat exchanger.

Further, when water condenses on the surface of the heat exchanger, bacteria easily grow in the condensed water and thus the surface of the heat exchanger is corroded due to the condensed water. Therefore, in this case, the heat exchanger needs to be sterilized and humidified by the heater exchanger sterilizing and humidifying apparatus.

As shown in FIGS. 1 to 3, various parts to sterilize the heat exchanger are mounted on the kit 200.

An upper cover 210 may be provided on the upper portion of the kit 200, thus covering the upper portion of the kit 200.

The kit 200 may include a pump device 220 to supply the sterilizing water, generated by a sterilizing water generation device (not shown) of the storage tank 200, which will be described later, to the spraying device 400, and a sterilizing water supply hose 230 allowing the sterilizing water to be transferred to the spraying device 400 by the pump device 220.

The sterilizing water supply hose 230 installed on the kit 200 may connect the storage tank 300 mounted on the kit 200 to the spraying device 400 to spray the sterilizing water to the heat exchanger.

The storage tank 300 may include the sterilizing water generation device (not shown) to convert water supplied to the storage tank 300 into sterilizing water, and the sterilizing water converted in the storage tank 300 may be pumped by the pumping device 200 and may be supplied to the spraying device 400 through the sterilizing water supply hose 230.

The kit 200 may include a power supply device (not shown) to supply power to the sterilizing water generation device (not shown) of the storage tank 300.

The power supply device (not shown) may supply power directly to the sterilizing water generation device (not shown) so as to allow water stored in the storage tank 300 to be converted into sterilizing water by the sterilizing water generation device (not shown).

The kit 200 may include a cover 240 to prevent the power supply device (not shown) from being exposed to the outside.

A water level sensor mounting hole 250 may be formed on the kit 200 so that the water level sensor 100 is mounted in the water level sensor mounting hole 250, and a discharge hose H connected to a support 500, which will be described later, to guide the sterilizing water, discharged after sterilization of the heat exchanger, to the outside may be connected to the kit 200.

By connecting the discharge hose H to the kit 200, if water stored in the storage tank 300 or sterilizing water converted in the storage tank 300 leaks to the outside of the storage tank 300 or if condensed water is formed on the outer surface of the storage tank 300, the leaked water or the condensed water is not collected in the kit 200 but is discharged to the outside through the discharge hose H.

As shown in FIGS. 1 and 2, the storage tank 300 may be detachably mounted on the kit 200 and may store water supplied by a user.

The sterilizing water generation device (not shown) to convert water supplied into the storage tank 300 to sterilizing water may be installed in the storage tank 300.

The sterilizing water generation device (not shown) installed in the storage tank 300 may be an OH⁻ radical electrode to generate OH⁻ radical water.

The OH⁻ radical water generated by the OH⁻ radical electrode takes part in sterilization and disinfection to chemically decompose and remove most contaminants but is harmless to humans.

The sterilizing water generation device (not shown) may be other electrolysis apparatuses as opposed to the OH⁻ radical electrode, and these electrolysis apparatuses may convert water supplied to the storage tank 300 into ozone water.

As shown in FIGS. 1 and 2, the spraying device 400 may include a nozzle case 410 and a nozzle cover 420.

The spraying device 400 may receive the sterilizing water generated by the storage tank 300 through the sterilizing water supply hose 230 installed on the kit 200 and spray the sterilizing water to the heat exchanger, thereby sterilizing and humidifying the heat exchanger.

The nozzle case 410 may include a nozzle (not shown) and stores the sterilizing water supplied from the storage tank 300 by the sterilizing water supply hole 230 installed on the kit 200.

The sterilizing water stored in the nozzle case 410 may be sprayed to the heat exchanger through the nozzle (not shown).

The nozzle case 410 may include a sealing member 430 to maintain an interval between the nozzle (not shown) of the nozzle case 410 and the heat exchanger located under the nozzle case 410.

The nozzle cover 420 may be located on the nozzle case 410 and may cover the upper portion of the nozzle case 410, thereby preventing the sterilizing water stored in the nozzle case 410 from being exposed to the outside.

As shown in FIGS. 1 and 2, the heat exchanger sterilizing and humidifying apparatus 1 further may include the support 500.

The support 500 may be mounted on the lower portion of the heat exchanger, and may serve to store the sterilizing water sprayed from the spraying device 400 after sterilization of the heat exchanger.

The discharge hose H may be connected to the support 500 so that the sterilizing water stored in the support 500 may be discharged to the outside of the air conditioner.

As shown in FIGS. 1 and 3, the water level sensor 100 may be detachably mounted in the water level sensor mounting hole 250 formed on the kit 200.

The water level sensor 100 mounted in the water level sensor mounting hole 250 of the kit 200 may be closely adhered to the outer surface of the storage tank 300 when the storage tank 300 is mounted on the kit 200, and thus may sense a level of water or sterilizing water in the storage tank 300.

By mounting the water level sensor 100 at the outside of the storage tank 300, various parts, which need to be installed within the storage tank 300 if the water level sensor 100 is installed within the storage tank 300, may be omitted, and thus the heat exchanger sterilizing and humidifying apparatus 1 may have a simple configuration.

The water level sensor 100 may sense a remaining amount of water or sterilizing water in the storage tank 300 and may transmit a signal to control the remaining amount to a control unit (not shown).

If water or sterilizing water is not present in the storage tank 300, the water level sensor 100 may stop a motor (not shown) of the pump device 220 to supply the sterilizing water in the storage tank 300 to the spraying device 400, thereby preventing idle rotation of the motor (not shown) and noise due to idle rotation of the motor (not shown).

Further, if a sterilizing and humidifying function is to be performed under the condition that water or sterilizing water is not present in the storage tank 300, the water level sensor 100 may transmit a signal instructing a user to put water thereinto.

Hereinafter, the water level sensor will be described in more detail with reference to FIGS. 4 to 7.

Figure 4:
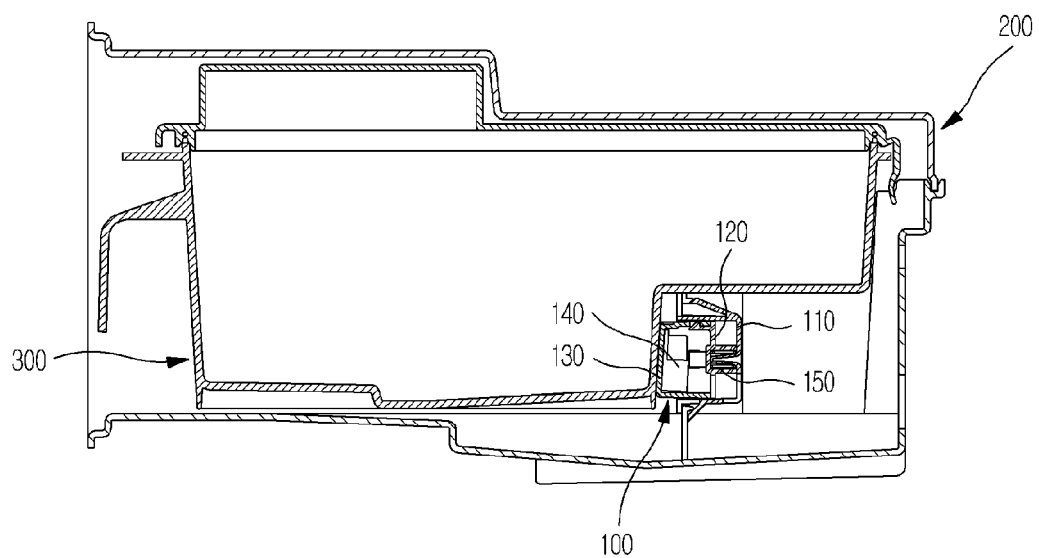
FIG. 4 is a cross-sectional view illustrating mounting of a water level sensor in accordance with one embodiment at the outside of a storage tank.
Figure 5:
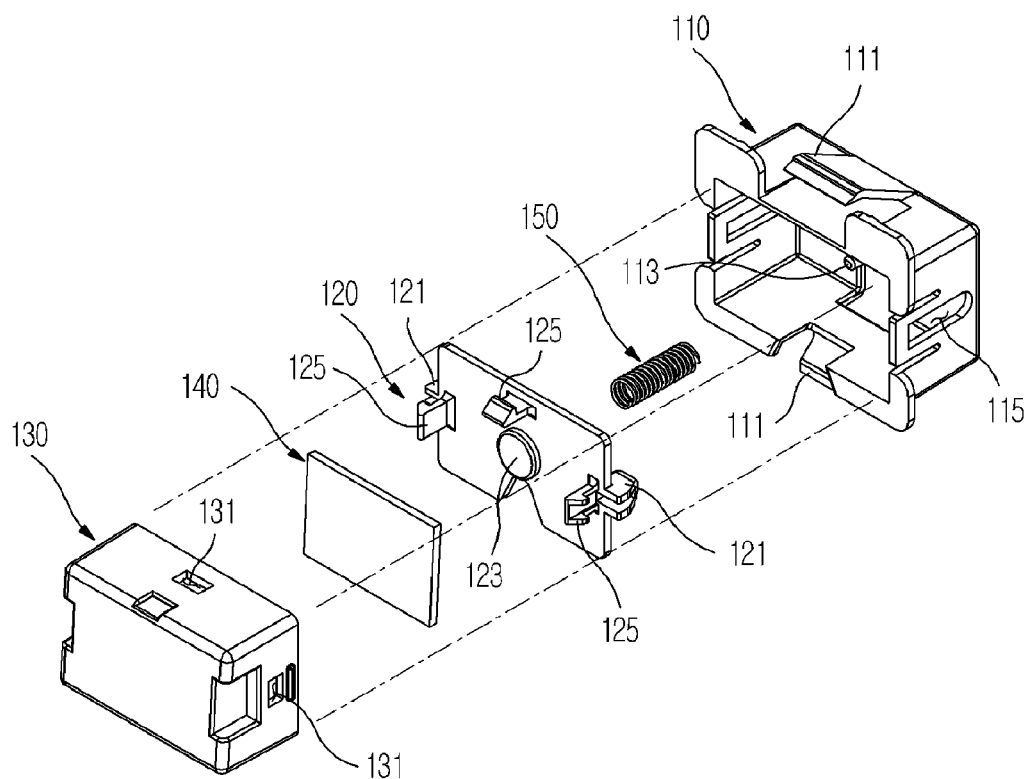
FIG. 5 is an exploded perspective view of the water level sensor in accordance with one embodiment.

FIG. 4 is a cross-sectional view illustrating mounting of the water level sensor in accordance with one embodiment at the outside of the storage tank and FIG. 5 is an exploded perspective view of the water level sensor in accordance with one embodiment.

As shown in FIGS. 4 and 5, the water level sensor 100 to sense a water level in the storage tank 300 may include a holder 110, a cap 120 connected to the holder 110 so as to reciprocate within the holder 110, a case 130 connected to the cap 120 so as to reciprocate within the holder 110 together with the cap 120, a sensor part 140 attached to the case 130 to sense the water level in the storage tank 300, and a spring 150 located between the holder 110 and the cap 120 so that the cap 120 and the case 130 may reciprocate within the holder 110.

As shown in FIGS. 4 and 5, hooks 111 may be formed on the upper and lower portions of the holder 110 of the water level sensor 100 so that the water level sensor 100 may be mounted on another structure.

Grooves into which the hooks 111 of the holder 110 of the water level sensor 100 may be inserted may be formed on the structure on which the water level sensor 100 is mounted, and the water level sensor 100 may be mounted on the structure by inserting the hooks 111 formed on the upper and lower portions of the holder 110 of the water level sensor 100 into the grooves formed on the structure.

A fixing part 113 inserted into the spring 150 to fix the spring 150 may be formed on the inner surface of the holder 110.

When the spring 150 is fixed to the fixing part 113 of the holder 110, the spring 150 does not move upward and downward and from side to side within the holder 110.

Guide grooves 115 to guide the cap 120 may be formed on both side surfaces of the holder 110 so that the cap 120 may reciprocate within the holder 110.

Protrusions 121 of the cap 120 connected to the holder 110 and reciprocating within the holder 110 may be inserted into the guide grooves 115 formed on the holder 110.

The protrusions 121 of the cap 120 may move along the guide grooves 115 formed on the holder 110 under the condition that the protrusions 121 are inserted into the guide grooves 115, allowing the cap 120 to reciprocate within the holder 110.

As shown in FIGS. 4 and 5, the cap 120 may include the protrusions 121 inserted into the guide grooves 115 formed on the holder 110, a fixing recess 123 into which the spring 150 is fixedly inserted, and hooks 125 inserted into connection holes 131 of the case 130, which will be described later.

The protrusions 121 may be formed at the right and left sides of the cap 120, and move along the guide grooves 115 formed on the holder 110 under the condition that the protrusions 121 are inserted into the guide grooves 115, thus allowing the cap 120 to reciprocate within the holder 110.

The fixing recess 123 may be formed on the cap 120 so as to correspond to the fixing part 113 formed on the holder 110, and the spring 150 may be fixed to the fixing part 113 of the holder 110 and the fixing recess 123 of the cap 120.

The hooks 125 may be formed at the upper end and the right and left sides of the cap 120.

The hooks 125 formed on the cap 120 may be inserted into the connection holes 131 formed on the case 130, thereby connecting the cap 120 and the case 130 to each other.

As shown in FIGS. 4 and 5, the connection holes 131 may be formed on the case 130.

The sensor part 140, which will be described later, may be attached to the case 130, and the case 130 may be connected to the cap 120 and thus reciprocates together with the cap 120 within the holder 110.

As shown in FIGS. 4 and 5, the sensor part 140 may be attached to the case 130.

The sensor part 140 may be attached to the case 130, and may sense a level of water or sterilizing water in the storage tank 300 when the storage tank 300 is closely adhered to the case 130.

The sensor part 140 may sense a water level through an electrostatic capacitive method without direct contact with water or sterilizing water in the storage tank 300.

As shown in FIGS. 4 and 5, the spring 150 may be located between the holder 110 and the cap 120 and may be fixed to the fixing part 113 of the holder 110 and the fixing recess 123 of the cap 120.

The cap 120 may reciprocate within the holder 110 due to restoring force of the spring 150, and the case 130 together with the cap 120 may reciprocate within the holder 110 under the condition that the case 130 is connected to the case 120.

Figure 6:
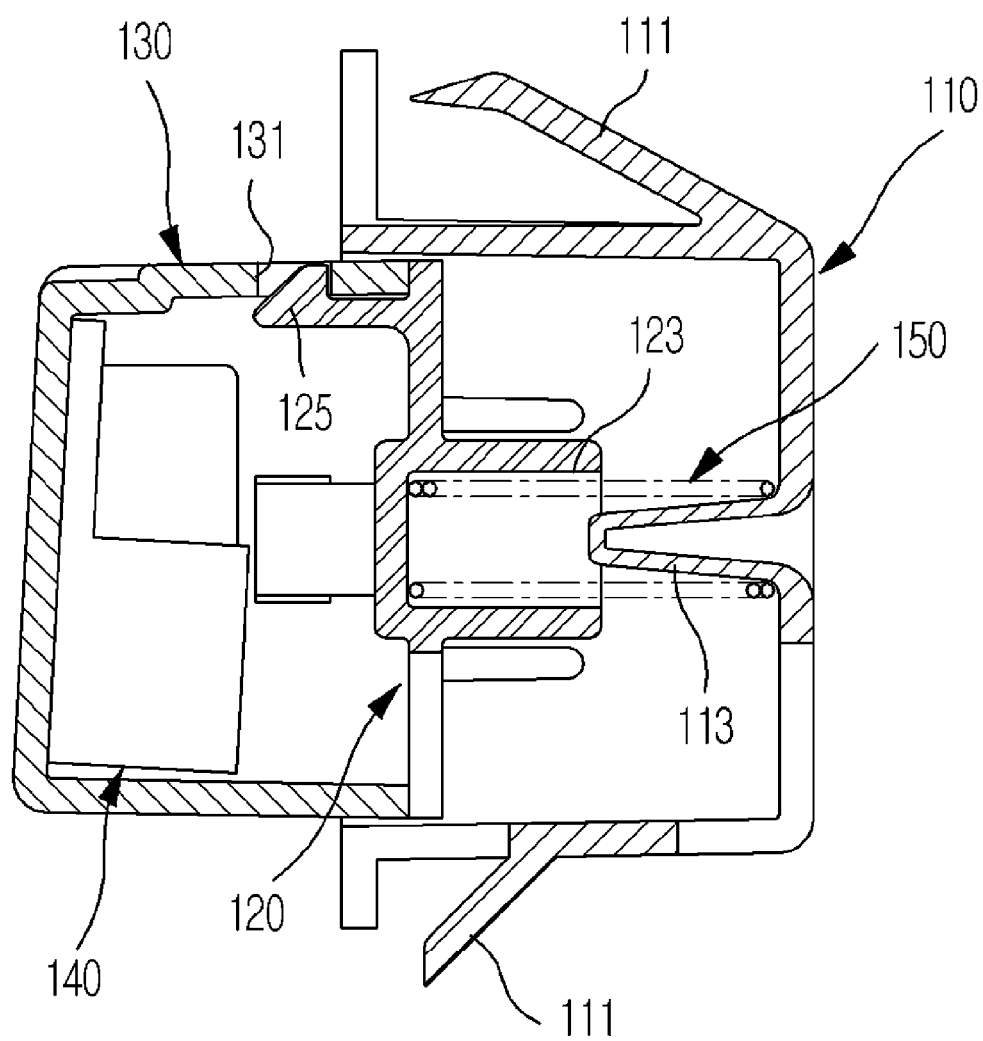
FIG. 6 is a cross-sectional view of the water level sensor in accordance with one embodiment.
Figure 7:
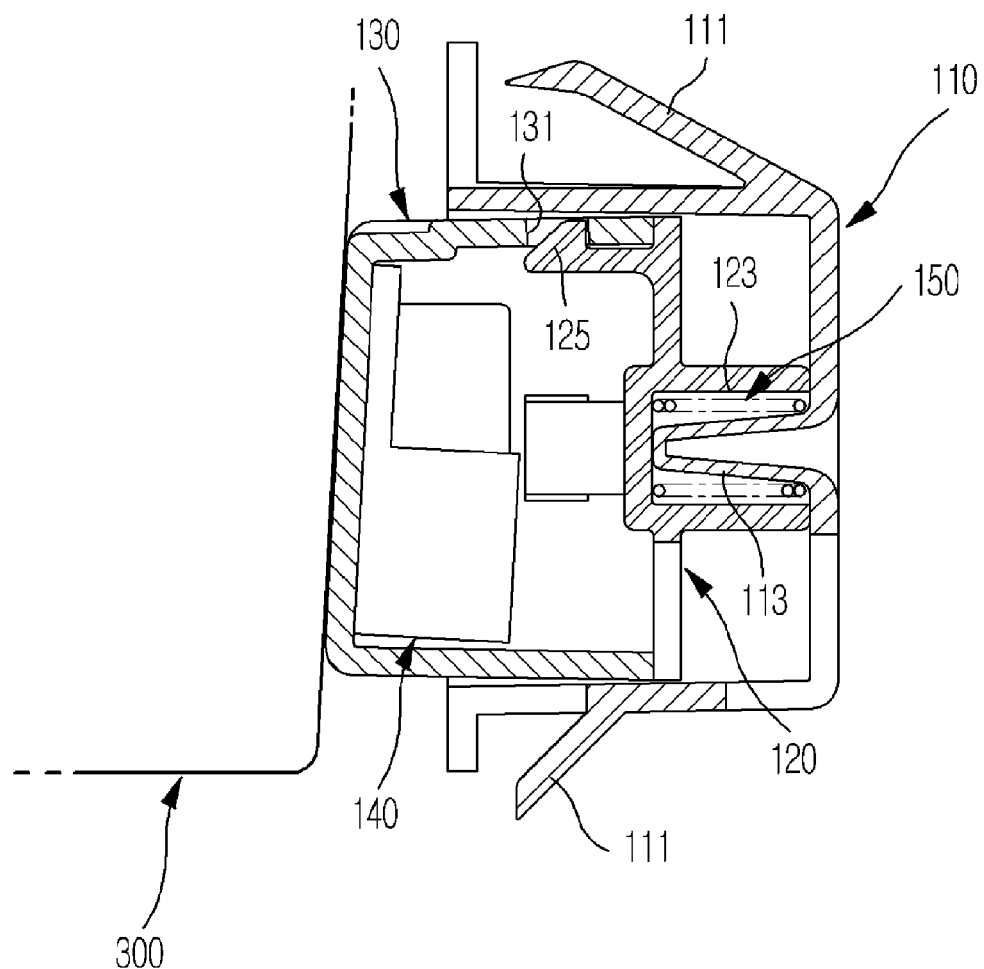
FIG. 7 is a cross-sectional view illustrating close adhesion of the water level sensor in accordance with one embodiment to the storage tank.

As shown in FIGS. 6 to 7, by configuring the case 130 so as to reciprocate within the holder 110, the case 130 may be pushed by the storage tank 300 and thus may move toward the holder 110 when the storage tank 300 contacts the case 130, and force in the opposite direction to pushing of the case 130 by the storage tank 300 may be applied to the sensor part 140 attached to the case 130 by the spring 150, thereby allowing the storage tank 300 and the sensor 140 to be closely adhered to each other.

As described above, although the above embodiment illustrates the water level sensor 100 and the heat exchanger sterilizing and humidifying apparatus 1 having the same as being provided in designated shape and direction, the embodiment is not limited thereto.

As is apparent from the above description, a water level sensor in accordance with one embodiment may be mounted at the outside of a storage tank, thereby achieving a simpler structure of a heat exchanger sterilizing and humidifying apparatus.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A water level sensor to sense a water level in a storage tank in which water is stored, comprising:
   a holder;
   a cap connected to the holder such that the cap reciprocates within the holder;
   a case connected to the cap such that the case together with the cap reciprocates within the holder;
   a sensor part attached to the case to sense the water level in the storage tank; and
   a spring located between the holder and the cap to allow the cap and the case to reciprocate within the holder,
   wherein the sensor part is mounted at the outside of the storage tank, the case is closely adhered to the storage tank by the restoring force of the spring when the storage tank contacts the case, and the sensor part thus is closely adhered to the storage tank and senses a level of water stored in the storage tank.

2. The water level sensor according to claim 1, wherein hooks are provided on the holder so as to mount the holder on another structure.

3. The water level sensor according to claim 1, wherein protrusions are formed on the cap, guide grooves are formed on the holder, and the protrusions are inserted into the guide grooves to guide the cap such that the cap reciprocates within the holder.

4. The water level sensor according to claim 3, wherein a fixing recess into which the spring is inserted is formed on the cap.

5. The water level sensor according to claim 4, wherein hooks are formed on the cap, connection holes are formed on the case, and the hooks formed on the cap are inserted into the connection holes so as to connect the cap to the case.

* * * * *